United States Patent
Wei et al.

(10) Patent No.: US 12,069,530 B2
(45) Date of Patent: Aug. 20, 2024

(54) INFRASTRUCTURE EQUIPMENT, COMMUNICATIONS DEVICES AND METHODS

(71) Applicant: Sony Corporation, Tokyo (JP)

(72) Inventors: Yuxin Wei, Basingstoke (GB); Samuel Asangbeng Atungsiri, Basingstoke (GB); Hideji Wakabayashi, Basingstoke (GB); Vivek Sharma, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 493 days.

(21) Appl. No.: 17/264,881

(22) PCT Filed: Aug. 7, 2019

(86) PCT No.: PCT/EP2019/071259
§ 371 (c)(1),
(2) Date: Feb. 1, 2021

(87) PCT Pub. No.: WO2020/030712
PCT Pub. Date: Feb. 13, 2020

(65) Prior Publication Data
US 2021/0306927 A1    Sep. 30, 2021

(30) Foreign Application Priority Data
Aug. 8, 2018 (EP) .................................. 18188060

(51) Int. Cl.
*H04W 4/00* (2018.01)
*H04W 36/00* (2009.01)
*H04W 36/32* (2009.01)

(52) U.S. Cl.
CPC ....... *H04W 36/32* (2013.01); *H04W 36/0088* (2013.01)

(58) Field of Classification Search
CPC ............. H04W 36/32; H04W 36/0088; H04W 36/0094; H04W 64/00; H04W 84/06; H04B 7/185
(Continued)

(56) References Cited

U.S. PATENT DOCUMENTS 6,138,021 A    10/2000  Arrington, Jr. et al.
6,606,307 B1 *  8/2003  Chang ................ H04B 7/18521
                                                    455/12.1
(Continued)

FOREIGN PATENT DOCUMENTS

WO    2016/008730 A1    1/2016
WO    2018/127395 A1    7/2018
(Continued)

OTHER PUBLICATIONS

Huawei et al: "Benefit of UL tracking", 3GPP Draft; R2-166987 Benefit of UL RS Tracking, 3rd Generation Partnership Project (3GPP), Mobile Competence Centre ; 650, Route Des Lucioles ; F-06921 Sophia-Antipolis Cedex; France (Year: 2016).*
(Continued)

*Primary Examiner* — Amancio Gonzalez
(74) *Attorney, Agent, or Firm* — XSENSUS LLP

(57) ABSTRACT

A method for operating an infrastructure equipment forming part of a wireless communications network is provided. The wireless communications network comprises a base station and a non-terrestrial network part, the non-terrestrial network part transmitting one or more spot beams to provide a wireless access interface for transmitting signals to and receiving signals representing data from a communications device within a coverage region of a cell or one of the spot beams, the spot beam forming a cell. The method comprises transmitting, to the communications device, an indication of a first condition to be met before the communications device (Continued)

should transmit assistance information to the infrastructure equipment, receiving the assistance information from the communications device upon the first condition being met, determining, based on the assistance information, that a cell change of the communications device should be initiated, and initiating the cell change of the communications device.

20 Claims, 7 Drawing Sheets

(58) Field of Classification Search
 USPC .......................................................... 370/331
 See application file for complete search history.

(56) References Cited

U.S. PATENT DOCUMENTS

| | | | | |
|---|---|---|---|---|
| 6,836,658 | B1* | 12/2004 | Sharon | H04B 7/18523 455/3.01 |
| 7,068,625 | B1* | 6/2006 | Schindler | H04W 36/02 370/336 |
| 7,113,780 | B2* | 9/2006 | McKenna | H04W 84/005 455/430 |
| 7,187,927 | B1* | 3/2007 | Mitchell | H04B 7/18541 455/431 |
| 7,697,456 | B2* | 4/2010 | Ekl | H04W 84/20 370/254 |
| 7,876,706 | B2* | 1/2011 | Ekl | H04L 45/48 370/254 |
| 8,290,542 | B2* | 10/2012 | Gosselin | H04L 51/214 455/420 |
| 8,472,960 | B2* | 6/2013 | Kitahara | H04W 36/008375 370/332 |
| 8,559,391 | B2* | 10/2013 | Lu | H04B 7/18506 370/332 |
| 8,606,190 | B2* | 12/2013 | Attanasio | H04M 3/2281 455/67.11 |
| 8,948,080 | B2* | 2/2015 | Wahlberg | H04B 7/18532 455/67.11 |
| 9,198,126 | B2* | 11/2015 | Topping | H04B 7/18543 |
| 9,654,202 | B2* | 5/2017 | Lozano | H04B 7/18513 |
| 9,929,471 | B2* | 3/2018 | Fonseca | H01P 5/19 |
| 9,979,789 | B2* | 5/2018 | Lu | H04L 67/12 |
| 10,034,183 | B2* | 7/2018 | Buer | H04W 24/02 |
| 10,034,210 | B2* | 7/2018 | Hara | H04W 36/36 |
| 10,152,357 | B1* | 12/2018 | Espy | G06F 11/3051 |
| 10,200,250 | B2* | 2/2019 | Roy | H04L 41/042 |
| 10,243,801 | B2* | 3/2019 | Xu | H04L 47/12 |
| 10,262,019 | B1* | 4/2019 | Reiner | H04L 67/10 |
| 10,461,842 | B2* | 10/2019 | Lu | H04W 84/18 |
| 10,536,202 | B2* | 1/2020 | Freedman | H04B 7/18515 |
| 11,216,413 | B1* | 1/2022 | Nanda | G06F 16/122 |
| 2007/0204021 | A1* | 8/2007 | Ekl | H04W 40/246 709/223 |
| 2014/0120917 | A1* | 5/2014 | Yoshihara | H04W 36/0055 455/436 |
| 2015/0158602 | A1* | 6/2015 | Marshack | H01Q 1/288 244/158.4 |
| 2016/0323800 | A1* | 11/2016 | Ulupinar | H04B 7/2041 |
| 2016/0373991 | A1* | 12/2016 | Corbel | H04W 36/30 |
| 2019/0115975 | A1* | 4/2019 | Freedman | H01Q 15/16 |

FOREIGN PATENT DOCUMENTS

| | | |
|---|---|---|
| WO | 2018/130366 A1 | 7/2018 |
| WO | 2019/201808 A1 | 10/2019 |

OTHER PUBLICATIONS

International Search Report and Written Opinion mailed on Oct. 28, 2019, received for PCT Application PCT/EP2019/071259, Filed on Aug. 7, 2019, 15 pages.
3GPP, "Study on New Radio (NR) to Support Non Terrestrial Networks", Release 15, TR 38.811 v0.3.0, Dec. 2017, pp. 1-56.
Holma et al., "LTE for UMTS OFDMA and SC-FDMA Based Radio Access", John Wiley and Sons, 2009, pp. 25-27.
NTT Docomo, "Revised WID on New Radio Access Technology", 3GPP TSG RAN Meeting #78, RP-172834, Dec. 18-21, 2017, 11 pages.
3GPP, "Study on Scenarios and Requirements for Next Generation Access Technologies", Release 14, TR 38.913, V14.2.0, Mar. 2017, pp. 1-38.
Huawei et al., "Benefit of UL Tracking", 3GPP TSG-RAN WG2 Meeting #95bis, R2-166987, 7 pages.
Ericsson, "Mobility Based on DL and UL Measurements", 3GPP TSG-RAN WG2 #94, Tdoc R2-163999, May 23-27, 2016, pp. 1-3.
Thales, "Study on Solutions Evaluation for NR to Support Non Terrestrial Network", 3GPP TSG RAN meeting #80, RP-181370, Jun. 11-14, 2018, 5 pages.

* cited by examiner

INFRASTRUCTURE EQUIPMENT, COMMUNICATIONS DEVICES AND METHODS

CROSS-REFERENCE TO RELATED APPLICATIONS

The present application is based on PCT filing PCT/EP2019/071259, filed Aug. 7, 2019, which claims priority to EP 18188060.0, filed Aug. 8, 2018, the entire contents of each are incorporated herein by reference.

BACKGROUND

Field of Disclosure

The present disclosure relates generally to communications devices, infrastructure equipment and methods of operating communications devices and infrastructure equipment and specifically to methods of performing conditional uplink mobility and handover optimisation in non-terrestrial networks.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to routinely and efficiently support communications with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new radio access technology (RAT) systems, as well as future iterations/releases of existing systems, to efficiently support connectivity for a wide range of devices associated with different applications and different characteristic data traffic profiles.

One example area of current interest in this regard includes so-called "non-terrestrial networks", or NTN for short. 3GPP has proposed in Release 15 of the 3GPP specifications to develop technologies for providing coverage by means of one or more antennas mounted on an airborne or space-borne vehicle [1].

Non-terrestrial networks may provide service in areas that cannot be covered by terrestrial cellular networks (i.e. those where coverage is provided by means of land-based antennas), such as isolated or remote areas, on board aircraft or vessels) or may provide enhanced service in other areas. The expanded coverage that may be achieved by means of non-terrestrial networks may provide service continuity for machine-to-machine (M2M) or 'internet of things' (IoT) devices, or for passengers on board moving platforms (e.g. passenger vehicles such as aircraft, ships, high speed trains, or buses). Other benefits may arise from the use of non-terrestrial networks for providing multicast/broadcast resources for data delivery.

The use of different types of network infrastructure equipment and requirements for coverage enhancement give rise to new challenges for efficiently handling communications in wireless communications systems that need to be addressed.

SUMMARY OF THE DISCLOSURE

The present disclosure can help address or mitigate at least some of the issues discussed above.

Embodiments of the present technique can provide a method for operating an infrastructure equipment forming part of a wireless communications network. The wireless communications network comprises a base station and a non-terrestrial network part, the non-terrestrial network part transmitting one or more spot beams to provide a wireless access interface for transmitting signals to and receiving signals representing data from a communications device within a coverage region of a cell or one of the spot beams, the spot beam forming a cell. The method comprises transmitting, to the communications device, an indication of a first condition to be met before the communications device should transmit assistance information to the infrastructure equipment, receiving the assistance information from the communications device upon the first condition being met, determining, based on the assistance information, that a cell change of the communications device should be initiated, and initiating the cell change of the communications device.

Embodiments of the present technique, which further relate to communications devices, methods of operating communications devices and infrastructure equipment and circuitry for communications devices and infrastructure equipment, allow for performance of conditional uplink mobility and handover optimisation in non-terrestrial networks. Such conditional uplink mobility and handover optimisation allow for the reduction in unnecessary reference signal transmissions and thus power consumption as well as control signalling overhead, whilst not sacrificing the handover performance Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Long Term Evolution Advanced Radio Access Technology (4G)

Figure 1:
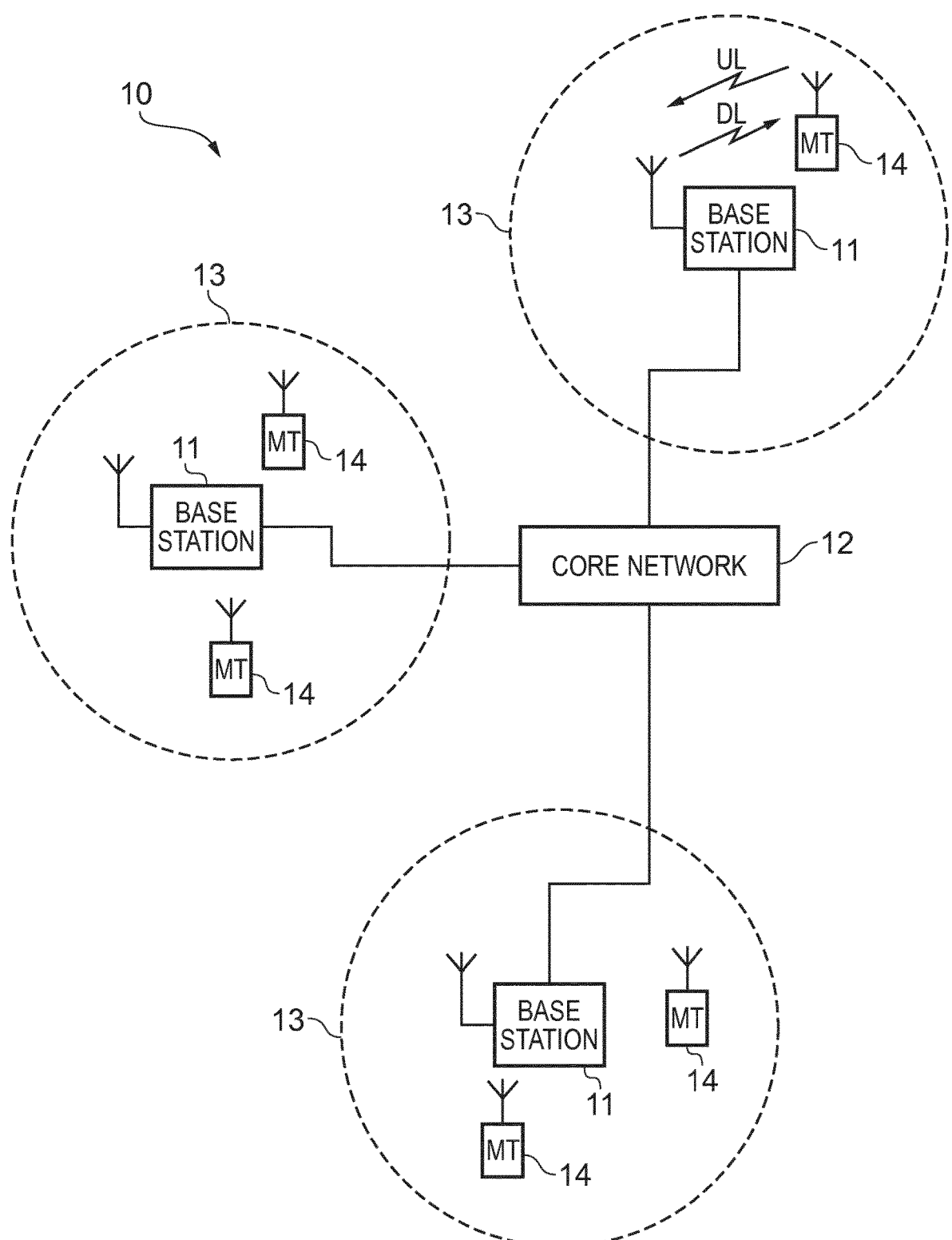
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 10 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP (RTM) body, and also described in many books on the subject, for example, Holma H. and Toskala A [2]. It will be appreciated that operational aspects of the telecommunications (or simply, communications) networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 10 includes a plurality of base stations 11 connected to a core network 12. Each base station provides a coverage area 13 (i.e. a cell) within which data can be communicated to and from terminal devices 14. Data is transmitted from base stations 11 to terminal devices 14 within their respective coverage areas 13 via a radio downlink (DL). Data is transmitted from terminal devices 14 to the base stations 11 via a radio uplink (UL). The core network 12 routes data to and from the terminal devices 14 via the respective base stations 11 and provides functions such as authentication, mobility management, charging and so on. Terminal devices may also be referred to as mobile stations, user equipment (UE), user terminal, mobile radio, communications device, and so forth. Base stations, which are an example of network infrastructure equipment/network access node, may also be referred to as transceiver stations/nodeBs/e-nodeBs/eNBs/g-nodeBs/gNBs and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G) As mentioned above, the embodiments of the present disclosure can also find application with advanced wireless communications systems such as those referred to as 5G or New Radio (NR) Access Technology. The use cases that are considered for NR include:

Enhanced Mobile Broadband (eMBB)
Massive Machine Type Communications (mMTC)
Ultra Reliable & Low Latency Communications (URLLC) [3]

eMBB services are characterised by high capacity with a requirement to support up to 20 Gb/s. The requirement for URLLC is a reliability of $1\text{-}10^{-5}$ (99.999%) for one transmission of a relatively short packet such as 32 bytes with a user plane latency of 1 ms [4].

The elements of the wireless access network shown in FIG. 1 may be equally applied to a 5G new RAT configuration, except that a change in terminology may be applied as mentioned above.

Figure 2:
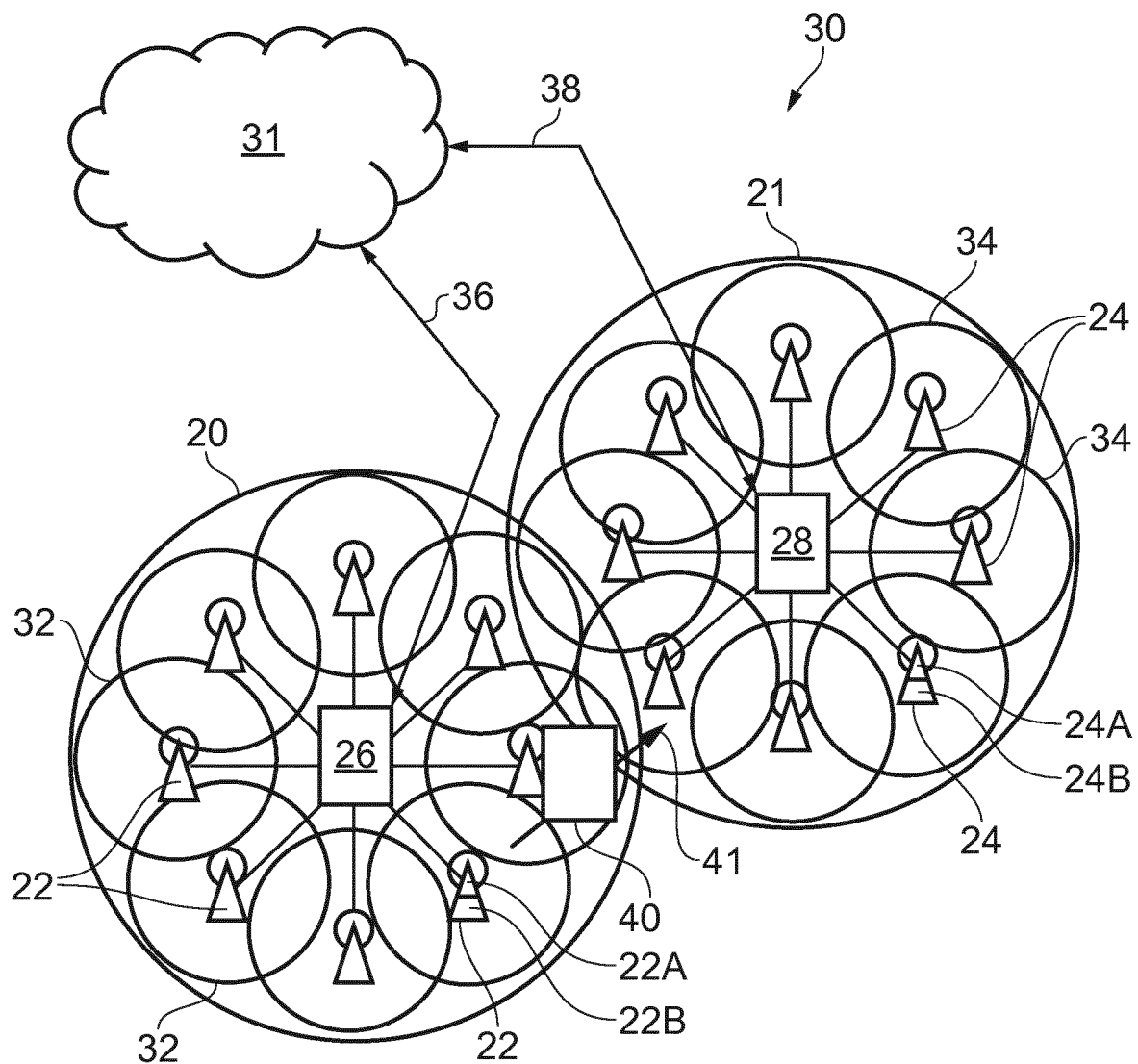
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless mobile telecommunications network/system 30 based on previously proposed approaches which may also be adapted to provide functionality in accordance with embodiments of the disclosure described herein. The new RAT network 30 represented in FIG. 2 comprises a first communication cell 20 and a second communication cell 21. Each communication cell 20, 21, comprises a controlling node (centralised unit) 26, 28 in communication with a core network component 31 over a respective wired or wireless link 36, 38. The respective controlling nodes 26, 28 are also each in communication with a plurality of distributed units (radio access nodes/remote transmission and reception points (TRPs)) 22, 24 in their respective cells. Again, these communications may be over respective wired or wireless links. The distributed units 22, 24 are responsible for providing the radio access interface for terminal devices connected to the network. Each distributed unit 22, 24 has a coverage area (radio access footprint) 32, 34 which together define the coverage of the respective communication cells 20, 21. Each distributed unit 22, 24 includes transceiver circuitry 22a, 24a for transmission and reception of wireless signals and processor circuitry 22b, 24b configured to control the respective distributed units 22, 24.

In terms of broad top-level functionality, the core network component 31 of the new RAT telecommunications system represented in FIG. 2 may be broadly considered to correspond with the core network 12 represented in FIG. 1, and the respective controlling nodes 26, 28 and their associated distributed units/TRPs 22, 24 may be broadly considered to provide functionality corresponding to base stations of FIG. 1. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the terminal devices may lie with the controlling node/centralised unit and/or the distributed units/TRPs.

A terminal device 40 is represented in FIG. 2 within the coverage area of the first communication cell 20. This terminal device 40 may thus exchange signalling with the first controlling node 26 in the first communication cell via one of the distributed units 22 associated with the first communication cell 20. In some cases communications for a given terminal device are routed through only one of the distributed units, but it will be appreciated in some other implementations communications associated with a given terminal device may be routed through more than one distributed unit, for example in a soft handover scenario and other scenarios.

The particular distributed unit(s) through which a terminal device is currently connected through to the associated controlling node may be referred to as active distributed units for the terminal device. Thus the active subset of distributed units for a terminal device may comprise one or more than one distributed unit (TRP). The controlling node 26 is responsible for determining which of the distributed units 22 spanning the first communication cell 20 is responsible for radio communications with the terminal device 40 at any given time (i.e. which of the distributed units are currently active distributed units for the terminal device). Typically this will be based on measurements of radio channel conditions between the terminal device 40 and respective ones of the distributed units 22. In this regard, it will be appreciated the subset of the distributed units in a cell which are currently active for a terminal device will depend, at least in part, on the location of the terminal device within the cell (since this contributes significantly to the radio channel conditions that exist between the terminal device and respective ones of the distributed units).

In at least some implementations the involvement of the distributed units in routing communications from the terminal device to a controlling node (controlling unit) is transparent to the terminal device 40. That is to say, in some cases the terminal device may not be aware of which distributed unit is responsible for routing communications between the terminal device 40 and the controlling node 26 of the communication cell 20 in which the terminal device is currently operating, or even if any distributed units 22 are connected to the controlling node 26 and involved in the routing of communications at all. In such cases, as far as the terminal device is concerned, it simply transmits uplink data to the controlling node 26 and receives downlink data from the controlling node 26 and the terminal device has no awareness of the involvement of the distributed units 22, though may be aware of radio configurations transmitted by distributed units 22. However, in other embodiments, a terminal device may be aware of which distributed unit(s) are involved in its communications. Switching and scheduling of the one or more distributed units may be done at the network controlling node based on measurements by the distributed units of the terminal device uplink signal or measurements taken by the terminal device and reported to the controlling node via one or more distributed units.

In the example of FIG. 2, two communication cells 20, 21 and one terminal device 40 are shown for simplicity, but it will of course be appreciated that in practice the system may comprise a larger number of communication cells (each supported by a respective controlling node and plurality of distributed units) serving a larger number of terminal devices.

It will further be appreciated that FIG. 2 represents merely one example of a proposed architecture for a new RAT telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architectures shown in FIGS. 1 and 2.

It will thus be appreciated the specific wireless telecommunications architecture in any given implementation is not of primary significance to the principles described herein. In this regard, certain embodiments of the disclosure may be described generally in the context of communications between network infrastructure equipment/access nodes and a terminal device, wherein the specific nature of the network infrastructure equipment/access node and the terminal device will depend on the network infrastructure for the implementation at hand. For example, in some scenarios the network infrastructure equipment/access node may comprise a base station, such as an LTE-type base station 11 as shown in FIG. 1 which is adapted to provide functionality in accordance with the principles described herein, and in other examples the network infrastructure equipment may comprise a control unit/controlling node 26, 28 and/or a TRP 22, 24 of the kind shown in FIG. 2 which is adapted to provide functionality in accordance with the principles described herein.

Non-Terrestrial Networks (NTNs)

Figure 3:
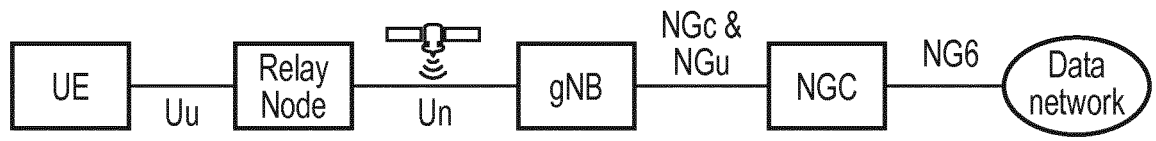
FIG. 3 is reproduced from [1], and illustrates a first example of an NTN featuring an access networking service relay nodes and based on a satellite/aerial with a bent pipe payload.
Figure 4:
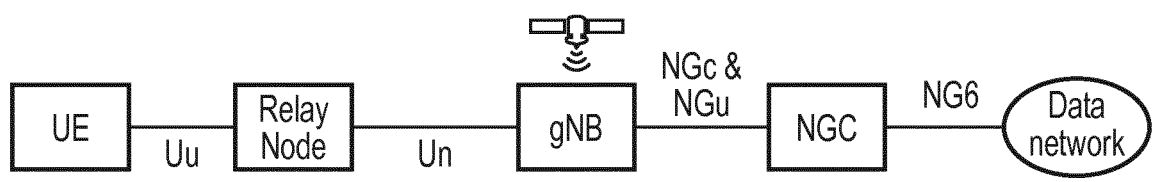
FIG. 4 is reproduced from [1], and illustrates a second example of an NTN featuring an access networking service relay nodes and based on a satellite/aerial coupled with a gNodeB.

An overview of NR-NTN can be found in [1], and much of the following wording, along with FIGS. 3 and 4, has been reproduced from that document as a way of background.

As a result of the wide service coverage capabilities and reduced vulnerability of space/airborne vehicles to physical attacks and natural disasters, Non-Terrestrial Networks are expected to:

foster the roll out of 5G service in un-served areas that cannot be covered by terrestrial 5G network (isolated/ remote areas, on board aircrafts or vessels) and underserved areas (e.g. sub-urban/rural areas) to upgrade the performance of limited terrestrial networks in cost effective manner, reinforce the 5G service reliability by providing service continuity for M2M/IoT devices or for passengers on board moving platforms (e.g. passenger vehicles-aircraft, ships, high speed trains, bus) or ensuring service availability anywhere especially for critical communications, future railway/maritime/aeronautical communications, and to enable 5G network scalability by providing efficient multicast/broadcast resources for data delivery towards the network edges or even user terminal.

The benefits relate to either Non-Terrestrial networks operating alone or to integrated terrestrial and Non-Terrestrial networks. They will impact at least coverage, user bandwidth, system capacity, service reliability or service availability, energy consumption and connection density. A role for Non-Terrestrial Network components in the 5G system is expected for at least the following verticals: transport, Public Safety, Media and Entertainment, eHealth, Energy, Agriculture, Finance and Automotive.

FIG. 3 illustrates a first example of an NTN featuring an access networking service relay nodes and based on a satellite/aerial with a bent pipe payload. In this example NTN, the satellite or the aerial will relay a "satellite friendly" NR signal between the gNodeB and the relay nodes in a transparent manner.

FIG. 4 illustrates a second example of an NTN featuring an access networking service relay nodes and based on a satellite/aerial coupled with a gNodeB. In this example NTN, the satellite or aerial embarks full or part of a gNodeB to generate or receive a "satellite friendly" NR signal to/form the relay nodes. This requires sufficient on-board processing capabilities to be able to include a gNodeB or relay node functionality.

Relay node (RN) related use cases such as those shown in FIGS. 3 and 4 will play an important role in the commercial deployment of NTN; i.e. relay nodes mounted on high speed trains, relay nodes mounted in cruise ships, relay nodes at home/office and relay nodes mounted on airliners. Embodiments of the present technique seek to address the handover for relay nodes. However, it should be well understood by those skilled in the art that the proposed solutions of embodiments of the present technique could be equally applied to conventional RNs/UEs as well.

Figure 5:
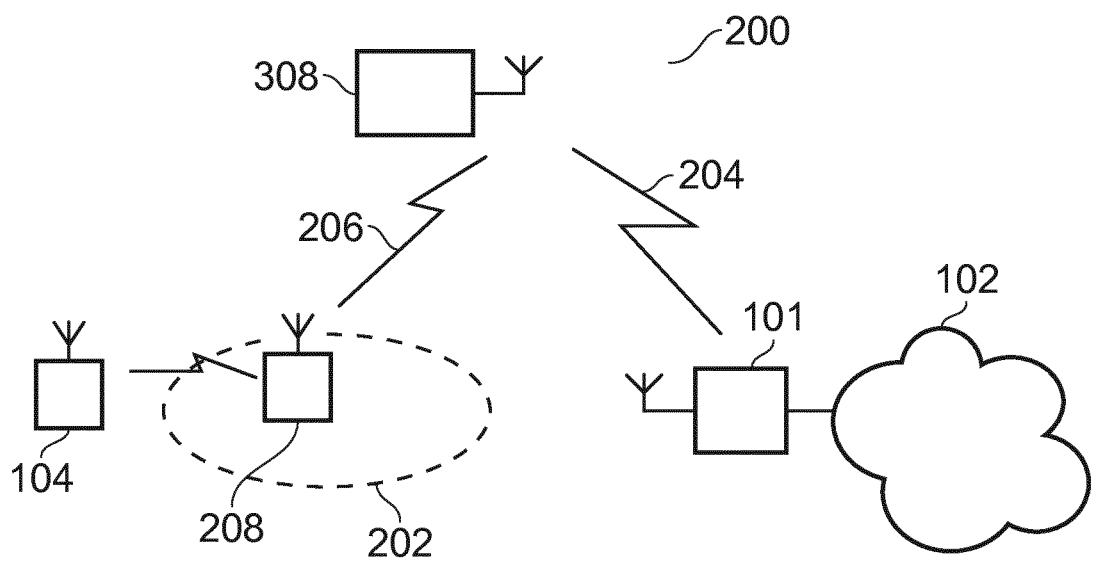
FIG. 5 schematically shows an example of a wireless communications system which may be configured to operate in accordance with embodiments of the present disclosure.

FIG. 5 schematically shows an example of a wireless communications system 200 which may be configured to operate in accordance with embodiments of the present disclosure. The wireless communications system 200 in this example is based broadly around an LTE-type or 5G-type architecture. Many aspects of the operation of the wireless communications system/network 200 are known and understood and are not described here in detail in the interest of brevity. Operational aspects of the wireless communications system 200 which are not specifically described herein may be implemented in accordance with any known techniques, for example according to the current LTE-standards or the proposed 5G standards.

The wireless communications system 200 comprises a core network part 102 (which may be a 5G core network or a NG core network) coupled to a radio network part. The radio network part comprises a base station (g-node B) 101 coupled to a non-terrestrial network part 308. The non-terrestrial network part 308 may be an example of infrastructure equipment. Alternatively, or in addition, the non-terrestrial network part 308 may be mounted on a satellite vehicle or on an airborne vehicle.

The non-terrestrial network part 308 is further coupled to a communications device 208, located within a cell 202, by means of a wireless access interface provided by a wireless communications link 206. For example, the cell 202 may correspond to the coverage area of a spot beam generated by the non-terrestrial network part 308. The boundary of the cell 202 may depend on an altitude of the non-terrestrial network part 308 and a configuration of one or more antennas of the non-terrestrial network part 308 by which the non-terrestrial network part 308 transmits and receives signals on the wireless access interface.

The non-terrestrial network part 308 may be a satellite in an orbit with respect to the Earth, or may be mounted on such a satellite. For example, the satellite may be in a geo-stationary earth orbit (GEO) such that the non-terrestrial network part 308 does not move with respect to a fixed point on the Earth's surface. The geo-stationary earth orbit may be approximately 36,000 km above the Earth's equator. Alternatively, the satellite may be in a non-geostationary orbit (NGSO), so that the non-terrestrial network part 308 moves with respect to a fixed point on the Earth's surface. The non-terrestrial network part 308 may be an airborne vehicle such as an aircraft, or may be mounted on such a vehicle. The airborne vehicle (and hence the non-terrestrial network part 308) may be stationary with respect to the surface of the Earth or may move with respect to the surface of the Earth.

In FIG. 5, the base station 101 is shown as ground-based, and coupled to the non-terrestrial network part 308 by means of a wireless communications link 204. The non-terrestrial network part 308 receives signals representing downlink data transmitted by the base station 101 on the wireless communications link 204 and, based on the received signals, transmits signals representing the downlink data via the wireless communications link 206 providing the wireless access interface for the communications device 206. Similarly, the non-terrestrial network part 308 receives signals representing uplink data transmitted by the communications device 206 via the wireless access interface comprising the wireless communications link 206 and transmits signals representing the uplink data to the base station 101 on the wireless communications link 204. The wireless communications links 204, 206 may operate at a same frequency, or may operate at different frequencies.

The extent to which the non-terrestrial network part 308 processes the received signals may depend upon a processing capability of the non-terrestrial network part 308. For example, the non-terrestrial network part 308 may receive signals representing the downlink data on the wireless communication link 204, amplify them and (if needed) re-modulate onto an appropriate carrier frequency for onwards transmission on the wireless access interface provided by the wireless communications link 206. Alternatively, the non-terrestrial network part 308 may be configured to decode the signals representing the downlink data received on the wireless communication link 204 into un-encoded downlink data, re-encode the downlink data and modulate the encoded downlink data onto the appropriate carrier frequency for onwards transmission on the wireless access interface provided by the wireless communications link 206.

The non-terrestrial network part 308 may be configured to perform some of the functionality conventionally carried out by the base station 101. In particular, latency-sensitive functionality (such as acknowledging a receipt of the uplink data, or responding to a RACH request) may be performed by the non-terrestrial network part 308 instead of by the base station 101.

The base station 101 may be co-located with the non-terrestrial network part 308; for example, both may be mounted on the same satellite vehicle or airborne vehicle, and there may be a physical (e.g. wired, or fibre optic) connection on board the satellite vehicle or airborne vehicle, providing the coupling between the base station 101 and the non-terrestrial network part 308. In such co-located arrangements, a wireless communications link between the base station 101 and a ground station (not shown) may provide connectivity between the base station 101 and the core network part 102.

The communications device 208 shown in FIG. 5 may be configured to act as a relay node. That is, it may provide connectivity to one or more terminal devices such as the terminal device 104. When acting as a relay node, the communications device 208 transmits and receives data to and from the terminal device 104, and relays it, via the non-terrestrial network part 308 to the base station 101. The communications device 208, acting as a relay node, may thus provide connectivity to the core network part 102 for terminal devices which are within a transmission range of the communications device 208.

It will be apparent to those skilled in the art that many scenarios can be envisaged in which the combination of the communications device 208 and the non-terrestrial network part 308 can provide enhanced service to end users. For example, the communications device 208 may be mounted on a passenger vehicle such as a bus or train which travels through rural areas where coverage by terrestrial base stations may be limited. Terminal devices on the vehicle may obtain service via the communications device 208 acting as a relay, which is coupled to the non-terrestrial network part 308.

There is a need to ensure that connectivity for the communications device 208 with the base station 101 can be maintained, in light of the movement of the communications device 208, the movement of the non-terrestrial network part 308 (relative to the Earth's surface), or both. According to conventional cellular communications techniques, a decision to change a serving cell of the communications device 208 may be based on measurements of one or more characteristics of a radio frequency communications channel, such as signal strength measurements or signal quality measurements. In a terrestrial communications network, such measurements may effectively provide an indication that the communications device 208 is at, or approaching, an edge of a coverage region of a cell, since, for example, path loss may broadly correlate to a distance from a base station. However, such conventional measurement-based algorithms may be unsuitable for cells generated by means of the transmission of beams from a non-terrestrial network part, such as the cell 202 generated by the non-terrestrial network part 308. In particular, path loss may be primarily dependent on an altitude of the non-terrestrial network part 308 and may vary only to a very limited extent (if at all) at the surface of the Earth, within the coverage region of the cell 202.

A further disadvantage of conventional techniques may be the relatively high rate at which cell changes occur for the communications device 208 obtaining service from one or more non-terrestrial network parts. For example, where the non-terrestrial network part 308 is mounted on a satellite in a low-earth orbit (LEO), the non-terrestrial network part 308 may complete an orbit of the Earth in around 90 minutes; the coverage of a cell generated by the non-terrestrial network part 308 will move very rapidly, with respect to a fixed observation point on the surface of the earth. Similarly, it may be expected that the communications device 208 may be mounted on an airborne vehicle itself, having a ground speed of several hundreds of kilometres per hour.

Unlike camping on a terrestrial cell, a RN/UE camps on a spot beam of a satellite which, in the case of (non-geostationary earth orbit (NGSEO) satellites, does move. This means that a RN/UE will camp on different spot beams (cells) and/or different satellites over time, regardless of whether or not the RN/UE itself is moving. As a result, it is foreseen that handover will likely be carried out much more frequently than in conventional terrestrial-based wireless networks, especially for LEO NTNs. For GEO NTNs, the spot beam coverage does not move, but handover will still be needed if the RN/UE is moving between the coverage of different spot beams. Handover procedure should be optimised in order to reduce the signalling overhead.

The uplink based mobility, where an uplink reference signal will be incorporated in the RN/UE side in order to help the network to perform measurements and make handover decisions based on these measurements if necessary, will be a potential solution for NTN. But it should be considered that sending uplink reference signals will impose a burden on the UE as well as occupying radio resources to accommodate these reference signals. The signalling cost will be non-negligible when there are many UEs which are each going to hand over to another cell. Hence, the trigger conditions to send the uplink (UL) reference signal could be optimised, in order to reduce the measurement efforts on the network side as well as to improve the radio resource efficiency when many UEs are concerned.

As described in co-pending European Patent Application, with application number EP18167616.4 [5], conditional handover is a promising scheme for NTN. While it is noted in [5] that the current conditional handover only specifies the conditions in which to initiate a handover execution, the extension of conditions to the measurement related optimisation could be further studied in order to reduce the measurement efforts in NTN.

UE Mobility and Conditional Handover Optimisation for NTN

Figure 6:
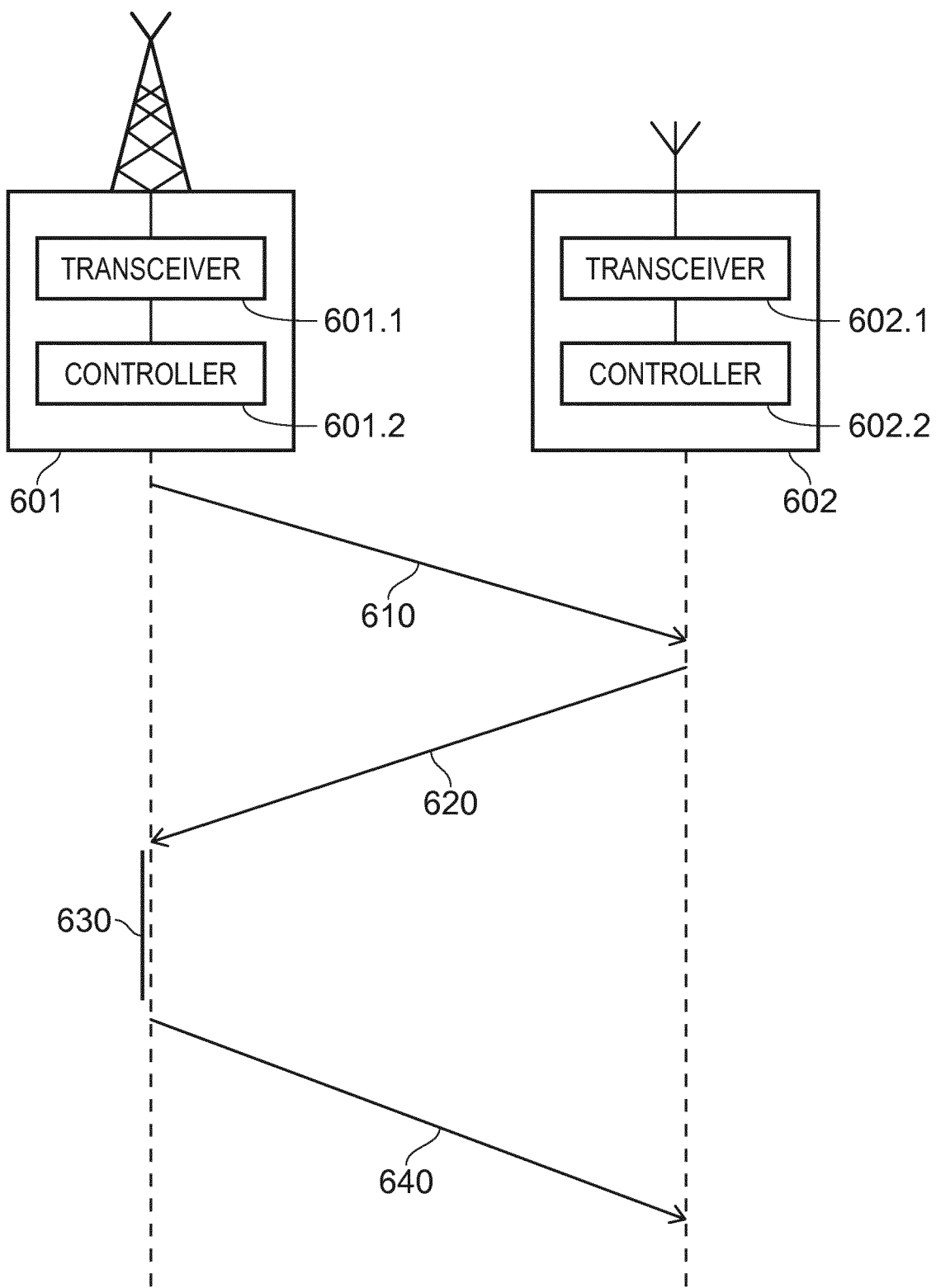
FIG. 6 shows a part schematic, part message flow diagram representation of a wireless communications network comprising an infrastructure equipment and a communications device in accordance with embodiments of the present technique.

Such problems as those discussed above may be overcome by embodiments of the present technique. FIG. 6 shows a part schematic, part message flow diagram representation of a wireless communications network comprising an infrastructure equipment 601 and a communications device 602 in accordance with embodiments of the present technique. The wireless communications network comprises a base station and a non-terrestrial network part, the non-terrestrial network part transmitting one or more spot beams to provide a wireless access interface for transmitting signals to and receiving signals representing data from the communications device 602 within a coverage region of a cell or one of the spot beams, the spot beam forming a cell.

The infrastructure equipment 601 and the communications device 602 each comprise a transceiver (or transceiver circuitry) 601.1, 602.1, and a controller (or controller circuitry) 601.2, 602.2. Each of the controllers 601.2, 602.2 may be, for example, a microprocessor, a CPU, or a dedicated chipset, etc.

The transceiver circuitry 601.1 and the controller circuitry 601.2 of the infrastructure equipment 601 are configured in combination to transmit 610, to the communications device 602, an indication of a first condition to be met before the communications device 602 should transmit assistance information (i.e. measureable information or measurement information) to the infrastructure equipment 601, to receive 620 the assistance information from the communications device 602 upon the first condition being met, to determine 630, based on the assistance information, that a cell change of the communications device 602 should be initiated, and to initiate 640 the cell change of the communications device 602.

Figure 7:
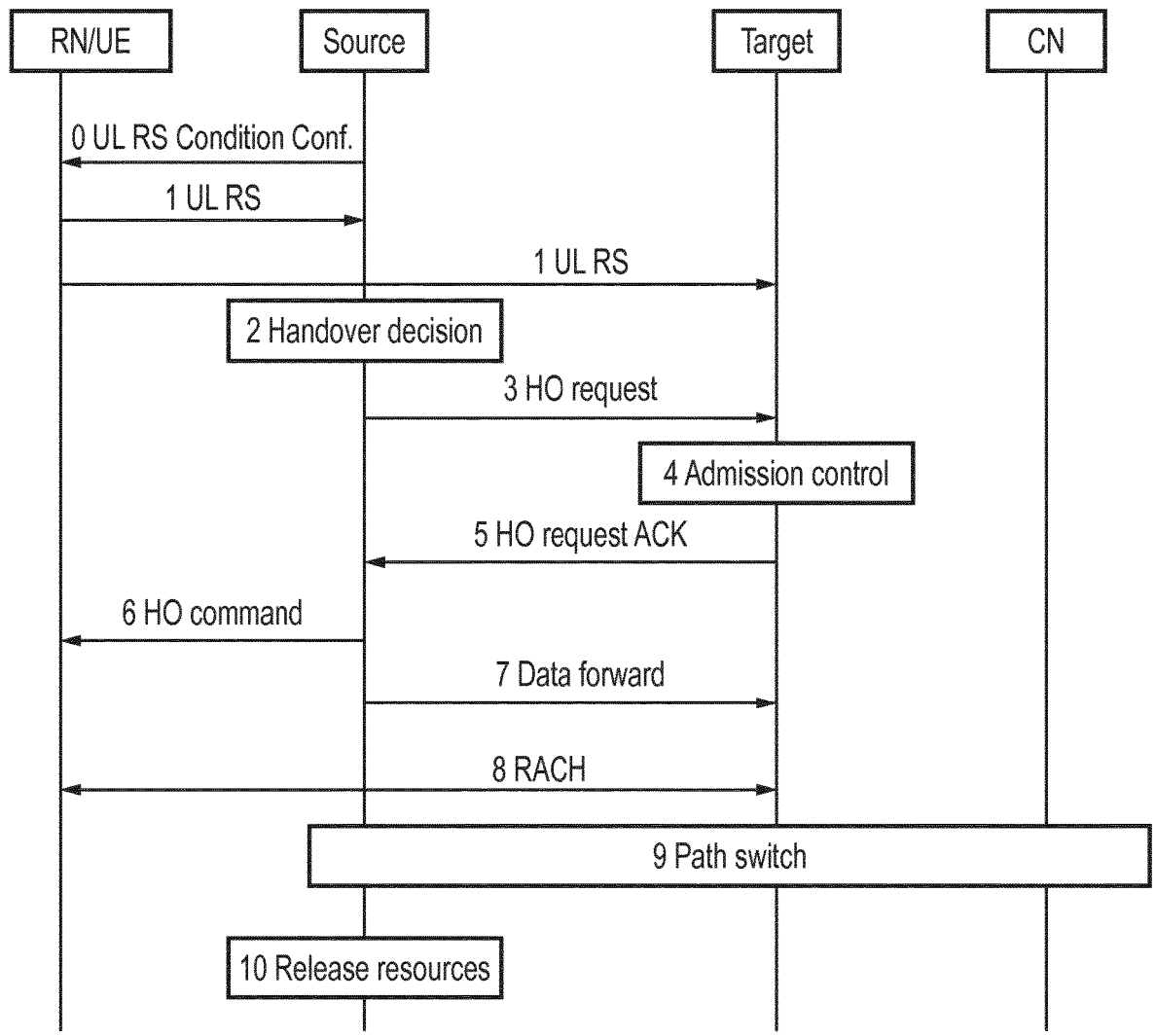
FIG. 7 shows a first example of uplink mobility based network initiated handover in accordance with embodiments of the present technique.

FIG. 7 shows a first example of uplink mobility based network initiated handover in accordance with embodiments of the present technique. In the example of FIG. 7, the assistance information comprises one or more uplink reference signals.

In step 0 of the procedure shown by FIG. 7, the source cell will issue an uplink reference signal transmission condition (also termed herein the "first condition") to the UE. The purpose of such an uplink reference signal transmission condition is to reduce unnecessary reference signal transmissions and thus power consumption as well as the control signalling overhead, whilst not sacrificing the handover performance. The source cell will acquire the UL reference signal configuration of the target cell, whose configuration could be different from the one in the source cell. For example, the source cell and target cell may be in different UL reference signal configuration zones. The source cell can estimate which cell would be the potential target cell according to, for example, the UE's location report and the spot beam/satellite's trajectory.

When the UE determines that the reference signal transmission condition has been satisfied, the UE transmits the reference signal in the UL in Step 1.

All cells in whose coverage the UE is currently located, such as the source and target cells, can receive and measure or analyse the UL reference signal. The source and target cell may need to exchange the UL reference signal configurations in advance if necessary. The source cell, on the basis of the results of these measurements/analysis of the UL reference signal, may then make a decision to initiate a cell change/handover in step 2. If this is the case, the source cell then transmits a request in step 3 to the target cell, which performs admission control whilst determining whether or not to accept the request in step 4. In step 5, the target cell sends an acknowledgement, #accepting the handover request, so that the source cell may transmit a handover command to the UE in step 6. Any data meant for the UE currently at the source cell is then transferred by the source cell to the target cell in step 7, and the UE performs a RACH procedure with the target cell in step 8 to form a connection with the target cell. In step 9, the core network is made aware of the cell change/handover, and once the UE has left the source cell, the source cell releases resources associated with the UE in step 10. In other words, initiating the cell change of the communications device comprises transmitting, to a second infrastructure equipment of the cell to which the communications device should change, the second infrastructure equipment having also received the one or more uplink reference signals from the communications device, a handover request, receiving, from the second infrastructure equipment, a handover request acknowledgement in response to the handover request, transmitting a handover command to the communications device, forwarding data relating to communications device to the second infrastructure equipment, indicating, to a core network part of the wireless communications network, in combination with the second infrastructure equipment, that the communications device has changed cell, and releasing communications resources associated with the communications device.

The uplink reference signal transmission condition may be the time duration after receiving the uplink reference signal transmission condition. As the network knows when the next spot beam/cell is going to cover the specific UE, the network can designate when the UE needs to start performing uplink reference signal transmissions in order to help the network make precise decisions on when to issue handover commands. In other words, the first condition comprises the expiry of a specified time duration since the indication of the first condition (i.e. the uplink reference signal transmission condition) having been received by the communications device.

The uplink reference signal transmission condition may be the UE's position/location area. Similarly to the uplink reference signal transmission condition being the time duration after receiving the uplink reference signal transmission condition as described above, the network can configure the UE to start performing uplink reference signal transmissions when in a specific geographical position or area. This specific geographical position or area will be that which, after reaching, the UE may need to handover to another cell/spot beam according to a satellite's path. In other words, the first condition comprises one of the infrastructure equipment and the communications device having moved into a specified geographical area relative to each other. Alternatively, the geographical area may instead be a logical area, or the first condition may be that the communications device has moved to a specified position with respect to a latus rectum of the infrastructure equipment (when the infrastructure equipment is for example a satellite or airborne vehicle/platform).

The uplink reference signal transmission condition may be the exceeding of a threshold by some measurement value taken at the UE such as a power measurement or RSRP of the downlink signal falling below a given threshold. Similarly to the uplink reference signal transmission condition being the time duration after receiving the uplink reference signal transmission condition as described above, the network can configure the UE to start performing uplink reference signal transmissions when the measured value of the aspect of the received signal, e.g. RSRP, falls below a set threshold. This specific threshold may relate to the expected propagation loss to be suffered by the current spot beam as the UE approaches its boundary, and so the UE may need to handover to another cell/spot beam. In other words, the first condition comprises one of the infrastructure equipment and the communications device having moved apart beyond a certain distance relative to each other, or the value of a measured attribute of the received signal crossing a set threshold since the first condition having been received by the communications device.

When the uplink reference signal transmission condition is either one or a combination of elapsed time and UE position, the UE may also change the uplink reference signal configuration as it gets closer to the time or the position or indeed after it exceeds the time or goes beyond the position. For example, if the UE moves nearer to the next cell/spot beam, it may adopt a configuration with a more time-frequent configured uplink reference signal. In other words, a configuration of the assistance information is dependent on the first condition.

It should be noted that the indication of the first condition transmitted by the infrastructure equipment can also include the uplink reference signal configuration (UE ID, reference signal resources etc.) message.

Figure 8:
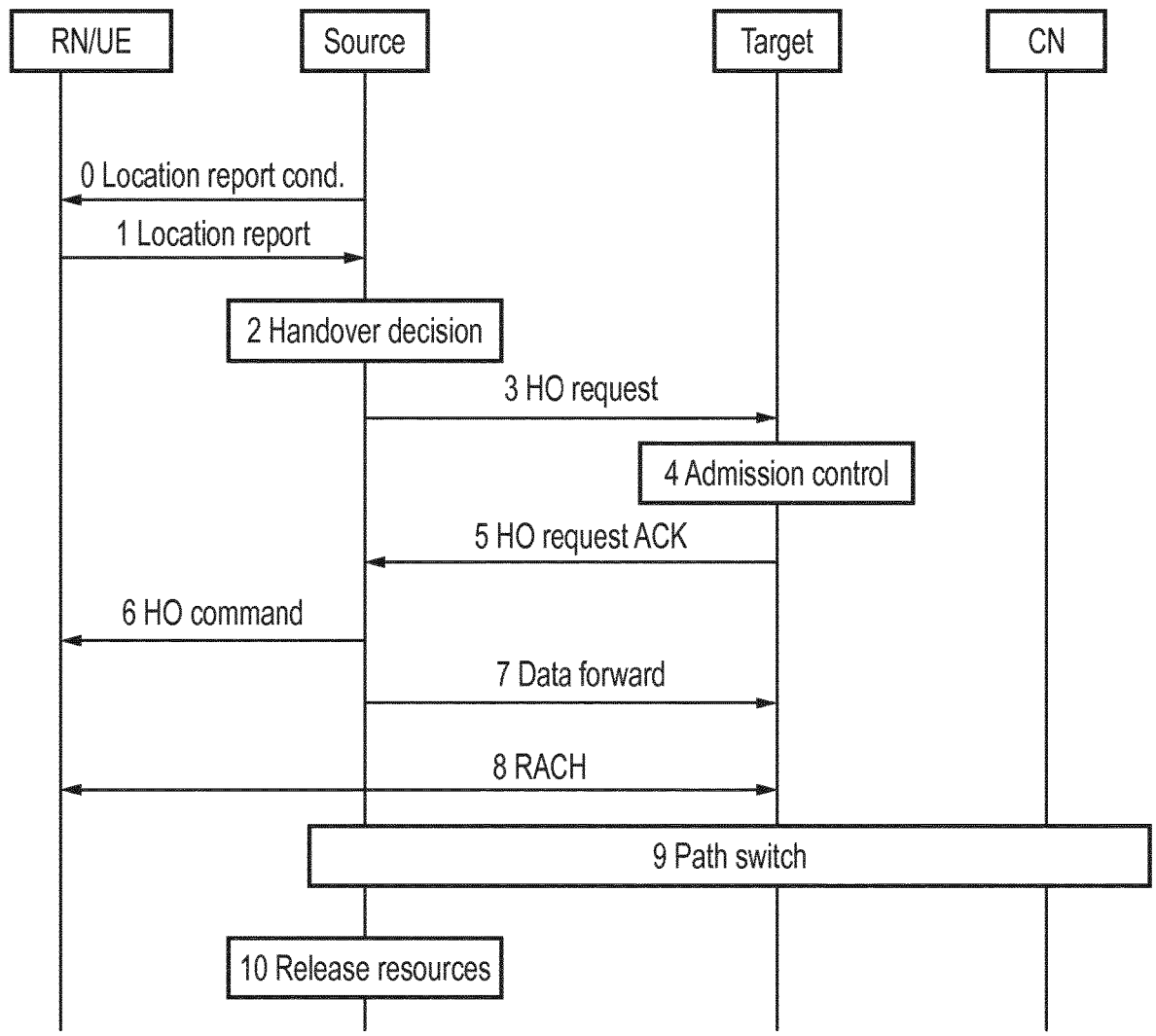
FIG. 8 shows a second example of uplink mobility based network initiated handover in accordance with embodiments of the present technique.

FIG. 8 shows a second example of uplink mobility based network initiated handover in accordance with embodiments of the present technique. In [5], the UE sends frequent reports of its position to the network so that the network can use these position reports to determine when to initiate handover or cell-reselection. In the example of FIG. 8, a location report is transmitted in step 1, the location report indicating a geographical area in which the communications device is located.

For the same reason as in the example of conditional uplink mobility shown in FIG. 7, in order to reduce the UE's efforts in sending a location report to the network, the network can also stipulate a condition for UE to initiate the sending of location reports as indicated in step 0.

Again, as in the example of FIG. 7, this condition may comprise the expiry of a specified time duration since the indication of the first condition having been received by the communications device, and/or one of the infrastructure equipment and the communications device having moved into a specified geographical area relative to each other. The following steps 2 to 10 of FIG. 8 are substantially the same as those corresponding steps of FIG. 7.

In the examples of both of FIG. 7 and FIG. 8, a RACH procedure may be optional, as the UE may need to be uplink synchronised to the target cell. The cell change/handover command may be sent using physical layer signalling, as depending on the location of the RRC entity on the network side (CU at the earth station), delay may be significant. Cell change/handover may be handled as inter-distributed unit handover without involving RRC signalling. So, a location report or an uplink reference signal or an uplink signal at regular timing intervals may be sent using RLC/MAC or PHY layer signalling.

The infrastructure equipment may be further configured to transmit, to the communications device, an indication of a second condition to be met before the communications device should start performing any necessary measurements, the assistance information consisting of the performed measurements, wherein the measured information is transmitted to the infrastructure equipment by the communications device upon both of the first condition and the second condition being met. Again, this second condition may comprise the expiry of a specified time duration since the indication of the first condition having been received by the communications device, and/or one of the infrastructure equipment and the communications device having moved into a specified geographical area relative to each other or moved apart by a specified distance.

In some arrangements of embodiments of the present technique, the coverage region of the cell varies over time in accordance with a motion of the non-terrestrial network part with respect to the surface of the Earth. Alternatively, in some arrangements of embodiments of the present technique, a trajectory of the non-terrestrial network part is such that the coverage region of the cell or the spot beam is substantially constant over a time period.

In some arrangements of embodiments of the present technique, the determining that the cell change of the communications device should be initiated comprises the infrastructure equipment being configured to determine a change in the coverage region of the cell or the spot beam based on a trajectory of the non-terrestrial network part, and to determine a relative motion, relative to the communications device, of the coverage region of the cell or spot beam based on the change in the coverage region of the cell or the spot beam.

In some arrangements of embodiments of the present technique, the determining that the cell change of the communications device should be initiated comprises determining, based on the uplink reference signals received at the infrastructure and on uplink reference signals received at a second infrastructure equipment, whether a link quality between the infrastructure equipment and the communications device has become worse than a link quality between the second infrastructure equipment and the communications device.

In some arrangements of embodiments of the present technique, the infrastructure equipment is the non-terrestrial network part. Alternatively, the infrastructure equipment may be the base station. The non-terrestrial network part may comprise a satellite, an airborne vehicle or an airborne platform. The airborne platform may for example be a High Altitude Pseudo Satellite (HAPS), also termed High Altitude Platform Station, which are positioned typically in the stratosphere at an altitude of above 20 km. An example of a HAPS may be a station tethered to an aircraft or a balloon.

In some arrangements of embodiments of the present technique, the communications device is a user equipment. Alternatively, the communications device may act as a relay node for one or more user equipment, each of the one or more user equipment being in one of an RRC connected mode, an RRC idle state or an RRC inactive state.

In some arrangements of embodiments of the present technique, the communications device may be in an RRC connected mode, and the initiating a cell change of the communications device by the infrastructure equipment comprises initiating a handover of the communications device.

Figure 9:
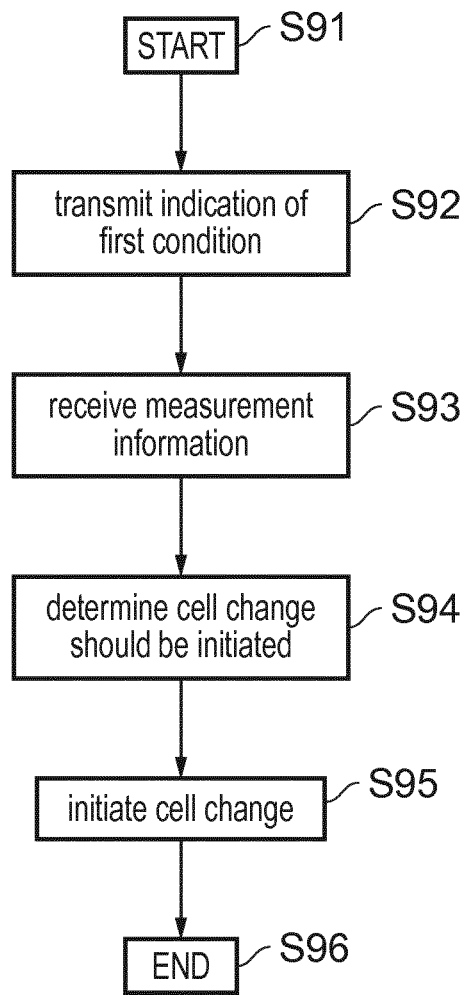
FIG. 9 is a flow diagram representation of a method of operating an infrastructure equipment according to embodiments of the present technique.

Flow Chart Representation FIG. 9 shows a flow diagram illustrating a method of operating an infrastructure equipment forming part of a wireless communications network according to embodiments of the present technique. The wireless communications network comprises a base station and a non-terrestrial network part, the non-terrestrial network part transmitting one or more spot beams to provide a wireless access interface for transmitting signals to and receiving signals representing data from a communications device within a coverage region of a cell or one of the spot beams, the spot beam forming a cell.

The method begins in step S91. The method comprises, in step S92, transmitting, to the communications device, an indication of a first condition to be met before the communications device should transmit either assistance information or uplink reference signals to the infrastructure equipment. In step S93, the process comprises the infrastructure equipment receiving the assistance information or uplink reference signals from the communications device upon the first condition being met. The method then advances to step S94, which comprises determining, based on the assistance information or processing of the uplink reference signals, that a cell change of the communications device should be initiated. In step S95, the process comprises initiating the cell change of the communications device. The process ends in step S96.

Those skilled in the art would appreciate that the method shown by FIG. 9 may be adapted in accordance with embodiments of the present technique. For example, other intermediate steps may be included in the method, or the steps may be performed in any logical order.

Those skilled in the art would further appreciate that such infrastructure equipment and/or communications devices as herein defined may be further defined in accordance with the various arrangements and embodiments discussed in the preceding paragraphs. It would be further appreciated by those skilled in the art that such infrastructure equipment and communications devices as herein defined and described may form part of communications systems other than those defined by the present disclosure.

The following numbered paragraphs provide further example aspects and features of the present technique:

Paragraph 1. A method for operating an infrastructure equipment forming part of a wireless communications network, the wireless communications network comprising a base station and a non-terrestrial network part, the non-terrestrial network part transmitting one or more spot beams to provide a wireless access interface for transmitting signals to and receiving signals representing data from a communications device within a coverage region formed by one of the cell or a spot beam forming a cell, the method comprising transmitting, to the communications device, an indication of a first condition to be met before the communications device should transmit assistance information to the infrastructure equipment, receiving the assistance information from the communications device upon the first condition being met, determining, based on the assistance information, that a cell change of the communications device should be initiated, and initiating the cell change of the communications device.

Paragraph 2. A method according to Paragraph 1, wherein the assistance information comprises one or more uplink reference signals.

Paragraph 3. A method according to Paragraph 2, wherein initiating the cell change of the communications device comprises transmitting, to a second infrastructure equipment of the cell to which the communications device should change, the second infrastructure equipment having also received the one or more uplink reference signals from the communications device, a handover request, receiving, from the second infrastructure equipment, a handover request acknowledgement in response to the handover request, transmitting a handover command to the communications device, forwarding data relating to communications device to the second infrastructure equipment, indicating, to a core network part of the wireless communications network, in combination with the second infrastructure equipment, that the communications device has changed cell, and releasing communications resources associated with the communications device.

Paragraph 4. A method according to any of Paragraphs 1 to 3, wherein the assistance information comprises a location report, the location report indicating a geographical area in which the communications device is located.

Paragraph 5. A method according to any of Paragraphs 1 to 4, wherein the first condition comprises the expiry of a specified time duration since the indication of the first condition having been received by the communications device.

Paragraph 6. A method according to any of Paragraphs 1 to 5, wherein the first condition comprises one of the infrastructure equipment and the communications device having moved into a specified geographical area relative to each other.

Paragraph 7. A method according to any of Paragraphs 1 to 6, wherein the first condition comprises the value of a measured attribute of the received signal crossing a set threshold since the first condition having been received by the communications device.

Paragraph 8. A method according to any of Paragraphs 1 to 7, wherein the first condition comprises one of the infrastructure equipment and the communications device having moved apart beyond a specified distance relative to each other.

Paragraph 9. A method according to any of Paragraphs 1 to 8, wherein a configuration of the assistance information is dependent on the first condition.

Paragraph 10. A method according to any of Paragraphs 1 to 9, comprising transmitting, to the communications device, an indication of a second condition to be met before the communications device should start performing measurements, the assistance information consisting of the performed measurements, wherein the assistance information is received by the infrastructure equipment from the communications device upon both of the first condition and the second condition being met.

Paragraph 11. A method according to Paragraph 10, wherein the second condition comprises the expiry of a specified time duration since the indication of the first condition having been received by the communications device.

Paragraph 12. A method according to Paragraph 10 or Paragraph 11, wherein the second condition comprises one of the infrastructure equipment and the communications device having moved into a specified geographical area relative to each other.

Paragraph 13. A method according to any of Paragraphs 10 to 12, wherein the second condition comprises the value of a measured attribute of the received signal crossing a set threshold since the first condition having been received by the communications device.

Paragraph 14. A method according to any of Paragraphs 10 to 13, wherein the second condition comprises one of the infrastructure equipment and the communications device having moved apart beyond a specified distance relative to each other.

Paragraph 15. A method according to any of Paragraphs 1 to 14, wherein the coverage region of the cell varies over time in accordance with a motion of the non-terrestrial network part with respect to the surface of the Earth.

Paragraph 16. A method according to any of Paragraphs 1 to 15, wherein the determining that the cell change of the communications device should be initiated comprises determining a change in the coverage region of the cell or the spot beam based on a trajectory of the non-terrestrial network part, and determining a relative motion, relative to the communications device, of the coverage region of the cell or spot beam based on the change in the coverage region of the cell or the spot beam.

Paragraph 17. A method according to any of Paragraphs 2 to 16, wherein the determining that the cell change of the communications device should be initiated comprises determining, based on the uplink reference signals received at the infrastructure and on uplink reference signals received at a second infrastructure equipment, whether a link quality between the infrastructure equipment and the communications device has become worse than a link quality between the second infrastructure equipment and the communications device.

Paragraph 18. A method according to any of Paragraphs 1 to 17, wherein a trajectory of the non-terrestrial network part is such that the coverage region of the cell or the spot beam is substantially constant over a time period.

Paragraph 19. A method according to any of Paragraphs 1 to 18, wherein the infrastructure equipment is the non-terrestrial network part.

Paragraph 20. A method according to any of Paragraphs 1 to 19, wherein the infrastructure equipment is the base station.

Paragraph 21. A method according to any of Paragraphs 1 to 20, wherein the non-terrestrial network part comprises a satellite, an airborne vehicle or an airborne platform.

Paragraph 22. A method according to any of Paragraphs 1 to 21, wherein the communications device is a user equipment.

Paragraph 23. A method according to any of Paragraphs 1 to 22, wherein the communications device is acting as a relay node for one or more user equipment, each of the one or more user equipment being in one of an RRC connected mode, an RRC idle state or an RRC inactive state.

Paragraph 24. A method according to any of Paragraphs 1 to 23, wherein
- the communications device is in an RRC connected mode, and
- initiating a cell change of the communications device comprises initiating a handover of the communications device.

Paragraph 25. An infrastructure equipment forming part of a wireless communications network, the wireless communications network comprising a base station and a non-terrestrial network part, the non-terrestrial network part transmitting one or more spot beams to provide a wireless access interface for transmitting signals to and receiving signals representing data from a communications device within a coverage region of a cell or one of the spot beams, the spot beam forming a cell, wherein the infrastructure equipment comprises transceiver circuitry and controller circuitry configured in combination
- to transmit, to the communications device, an indication of a first condition to be met before the communications device should transmit assistance information to the infrastructure equipment,
- to receive the assistance information from the communications device upon the first condition being met,
- to determine, based on the assistance information, that a cell change of the communications device should be initiated, and
- to initiate the cell change of the communications device.

Paragraph 26. Circuitry for an infrastructure equipment forming part of a wireless communications network, the wireless communications network comprising a base station and a non-terrestrial network part, the non-terrestrial network part transmitting one or more spot beams to provide a wireless access interface for transmitting signals to and receiving signals representing data from a communications device within a coverage region of a cell or one of the spot beams, the spot beam forming a cell, wherein the infrastructure equipment comprises transceiver circuitry and controller circuitry configured in combination
- to transmit, to the communications device, an indication of a first condition to be met before the communications device should transmit assistance information to the infrastructure equipment,
- to receive the assistance information from the communications device upon the first condition being met,
- to determine, based on the assistance information, that a cell change of the communications device should be initiated, and
- to initiate the cell change of the communications device.

Paragraph 27. A method for operating a communications device in a wireless communications network, the wireless communications network comprising a base station and a non-terrestrial network part, the non-terrestrial network part transmitting one or more spot beams to provide a wireless access interface for transmitting signals to and receiving signals representing data from a communications device within a coverage region of a cell or one of the spot beams, the spot beam forming a cell, the method comprising
- receiving, from one of the base station and the non-terrestrial network part, an indication of a first condition to be met before the communications device should transmit assistance information to the one of the base station and the non-terrestrial network part,
- determining that the first condition has been met,
- transmitting the assistance information to the one of the base station and the non-terrestrial network part upon determining that the first condition has been met,
- receiving, from the one of the base station and the non-terrestrial network part, a command indicating that a cell change of the communications device should be initiated, and
- establishing a connection in another cell in response to receiving the command.

Paragraph 28. A communications device configured to operate in a wireless communications network, the wireless communications network comprising a base station and a non-terrestrial network part, the non-terrestrial network part transmitting one or more spot beams to provide a wireless access interface for transmitting signals to and receiving signals representing data from a communications device within a coverage region of a cell or one of the spot beams, the spot beam forming a cell, wherein the communications device comprises transceiver circuitry and controller circuitry configured in combination
- to receive, from one of the base station and the non-terrestrial network part, an indication of a first condition to be met before the communications device should transmit assistance information to the one of the base station and the non-terrestrial network part,
- to determine that the first condition has been met,
- to transmit the assistance information to the one of the base station and the non-terrestrial network part upon determining that the first condition has been met,
- to receive, from the one of the base station and the non-terrestrial network part, a command indicating that a cell change of the communications device should be initiated, and
- to establish a connection in another cell in response to receiving the command.

Paragraph 29. Circuitry for a communications device configured to operate in a wireless communications network, the wireless communications network comprising a base station and a non-terrestrial network part, the non-terrestrial network part transmitting one or more spot beams to provide a wireless access interface for transmitting signals to and receiving signals representing data from a communications device within a coverage region of a cell or one of the spot beams, the spot beam forming a cell, wherein the communications device comprises transceiver circuitry and controller circuitry configured in combination
- to receive, from one of the base station and the non-terrestrial network part, an indication of a first condition to be met before the communications device should transmit assistance information to the one of the base station and the non-terrestrial network part, to determine that the first condition has been met, to transmit the assistance information to the one of the base station and the non-terrestrial network part upon determining that the first condition has been met, to receive, from the one of the base station and the non-terrestrial network part, a command indicating that a cell change of the communications device should be initiated, and to establish a connection in another cell in response to receiving the command.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] TR 38.811, "Study on New Radio (NR) to support non terrestrial networks (Release 15)", 3rd Generation Partnership Project, December 2017.
[2] Holma H. and Toskala A, "LTE for UMTS OFDMA and SC-FDMA based radio access", John Wiley and Sons, 2009.
[3] RP-172834, "Revised WID on New Radio Access Technology," NTT DOCOMO, RAN #78.
[4] TR 38.913, "Study on Scenarios and Requirements for Next Generation Access Technologies (Release 14)", 3rd Generation Partnership Project.
[5] European Patent Application no. EP18167616.4, 16 Apr. 2018.

What is claimed is:

1. A method for operating an infrastructure equipment forming part of a wireless communications network, the wireless communications network comprising a base station and a non-terrestrial network part, the non-terrestrial network part transmitting one or more spot beams to provide a wireless access interface for transmitting signals to and receiving signals representing data from a communications device within a coverage region formed by one of a cell or a spot beam forming the cell, the method comprising:

transmitting, to the communications device, an indication of a first condition to be met before the communications device should transmit assistance information to the infrastructure equipment, the first condition including at least a change in the coverage region of the cell based on movement of the cell, receiving the assistance information from the communications device upon the first condition being met, determining, based on the assistance information, whether a cell change of the communications device should be initiated, and in a case that the cell change of the communications device should be initiated, initiating the cell change of the communications device.

2. The method according to claim 1, wherein the assistance information comprises one or more uplink reference signals.

3. The method according to claim 2, wherein initiating the cell change of the communications device comprises:

transmitting, to a second infrastructure equipment of the cell to which the communications device should change, the second infrastructure equipment having also received the one or more uplink reference signals from the communications device, a handover request, receiving, from the second infrastructure equipment, a handover request acknowledgement in response to the handover request, transmitting a handover command to the communications device, forwarding data relating to communications device to the second infrastructure equipment, indicating, to a core network part of the wireless communications network, in combination with the second infrastructure equipment, that the communications device has changed cell, and releasing communications resources associated with the communications device.

4. The method according to claim 1, wherein the assistance information comprises a location report, the location report indicating a geographical area in which the communications device is located.

5. The method according to claim 1, wherein the first condition comprises the expiry of a specified time duration since the indication of the first condition having been received by the communications device.

6. The method according to claim 1, wherein the first condition further comprises one of the infrastructure equipment and the communications device having moved into a specified geographical area relative to each other.

7. The method according to claim 1, wherein the first condition comprises the value of a measured attribute of the received signal crossing a set threshold since the first condition having been received by the communications device.

8. The method according to claim 1, wherein the first condition further comprises one of the infrastructure equipment and the communications device having moved apart beyond a specified distance relative to each other.

9. The method according to claim 1, wherein a configuration of the assistance information is dependent on the first condition.

10. The method according to claim 1, comprising:
transmitting, to the communications device, an indication of a second condition to be met before the communications device should start performing measurements, the assistance information consisting of the performed measurements,
wherein the assistance information is received by the infrastructure equipment from the communications device upon both of the first condition and the second condition being met.

11. The method according to claim 1, wherein the coverage region of the cell varies over time in accordance with a motion of the non-terrestrial network part with respect to the surface of the Earth.

12. The method according to claim 1, wherein the determining that the cell change of the communications device should be initiated comprises:
determining a change in the coverage region of the cell or the spot beam based on a trajectory of the non-terrestrial network part, and
determining a relative motion, relative to the communications device, of the coverage region of the cell or spot beam based on the change in the coverage region of the cell or the spot beam.

13. The method according to claim 2, wherein the determining that the cell change of the communications device should be initiated comprises determining, based on the uplink reference signals received at the infrastructure and on uplink reference signals received at a second infrastructure equipment, whether a link quality between the infrastructure equipment and the communications device has become worse than a link quality between the second infrastructure equipment and the communications device.

14. The method according to claim 1, wherein a trajectory of the non-terrestrial network part is such that the coverage region of the cell or the spot beam is substantially constant over a time period.

15. The method according to claim 1, wherein the infrastructure equipment is the non-terrestrial network part.

16. The method according to claim 1, wherein the infrastructure equipment is the base station.

17. The method according to claim 1, wherein the non-terrestrial network part comprises a satellite, an airborne vehicle or an airborne platform.

18. The method according to claim 1, wherein the communications device is acting as a relay node for one or more user equipment, each of the one or more user equipment being in one of an RRC connected mode, an RRC idle state or an RRC inactive state.

19. The method according to claim 1, wherein
the communications device is in an RRC connected mode, and
initiating a cell change of the communications device comprises initiating a handover of the communications device.

20. An infrastructure equipment forming part of a wireless communications network, the wireless communications network comprising a base station and a non-terrestrial network part, the non-terrestrial network part transmitting one or more spot beams to provide a wireless access interface for transmitting signals to and receiving signals representing data from a communications device within a coverage region of a cell or one of the spot beams, the spot beam forming a cell, wherein the infrastructure equipment comprises transceiver circuitry and controller circuitry configured in combination:
to transmit, to the communications device, an indication of a first condition to be met before the communications device should transmit assistance information to the infrastructure equipment, the first condition including at least a change in the coverage region of the cell based on movement of the cell,
to receive the assistance information from the communications device upon the first condition being met,
to determine, based on the assistance information, whether a cell change of the communications device should be initiated, and
in a case that the cell change of the communications device should be initiated, to initiate the cell change of the communications device.

* * * * *